(12) United States Patent
Riedy et al.

(10) Patent No.: US 11,226,880 B2
(45) Date of Patent: *Jan. 18, 2022

(54) COMMUNICATION OF DIAGNOSTIC PARAMETERS OF A DATA MIRRORING CONFIGURATION FROM A STORAGE CONTROLLER TO A HOST

(71) Applicant: INTERNATIONAL BUSINESS MACHINES CORPORATION, Armonk, NY (US)

(72) Inventors: Dale F. Riedy, Poughkeepsie, NY (US); Scott B. Compton, Hyde Park, NY (US); Susan K. Candelaria, Tucson, AZ (US); Roger G. Hathorn, Tucson, AZ (US); Harry M. Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,797

(22) Filed: Dec. 7, 2018

(65) Prior Publication Data

US 2020/0183798 A1 Jun. 11, 2020

(51) Int. Cl.
*G06F 11/20* (2006.01)
*G06F 3/06* (2006.01)

(52) U.S. Cl.
CPC ......... *G06F 11/2056* (2013.01); *G06F 3/061* (2013.01); *G06F 3/067* (2013.01); *G06F 3/0635* (2013.01)

(58) Field of Classification Search
CPC ...... G06F 11/2056; G06F 3/061; G06F 3/067; G06F 3/0635
See application file for complete search history.

(56) References Cited

U.S. PATENT DOCUMENTS

| | | |
|---|---|---|
| 6,961,767 B2 | 11/2005 | Coffey et al. |
| 7,143,008 B2 | 11/2006 | Ochi et al. |
| 8,060,650 B2 | 11/2011 | Jansz et al. |

(Continued)

OTHER PUBLICATIONS

Metro Mirror and Global Mirror Data Copy: What's the difference?, Maximum Midrange Blog, Apr. 14, 2016 [retrieved from internet Jan. 24, 2020][<URL:https://www.maximummidrange.com/blog/metro-mirror-and-global-mirror-whats-the-difference/3851>] (Year: 2016).*

(Continued)

*Primary Examiner* — David Yi
*Assistant Examiner* — Nicholas A. Paperno
(74) *Attorney, Agent, or Firm* — Konrad Raynes Davda & Victor LLP; Rabindranath Dutta

(57) ABSTRACT

A storage controller is configured to communicate with a host over a first storage area network. Data controlled via the storage controller is mirrored to another storage controller over a second storage area network. The storage controller receives a request from the host to provide read diagnostic parameters of the second storage area network. In response to receiving the request, the storage controller secures the read diagnostic parameters of the second storage area network. The storage controller transmits the read diagnostic parameters of the second storage area network to the host.

23 Claims, 11 Drawing Sheets

(56) References Cited

U.S. PATENT DOCUMENTS

| | | | |
|---|---|---|---|
| 8,429,392 | B2 | 4/2013 | Miyauchi |
| 9,077,448 | B2 | 7/2015 | Hathorn et al. |
| 9,385,967 | B1* | 7/2016 | Hathorn ............... H04L 47/826 |
| 9,667,476 | B2 | 5/2017 | Benner et al. |
| 9,965,200 | B1 | 5/2018 | Gill et al. |
| 2014/0075110 | A1* | 3/2014 | Benhase ............... G06F 3/0619 |
| | | | 711/114 |
| 2015/0134923 | A1 | 5/2015 | Kulkarni et al. |
| 2015/0169242 | A1 | 6/2015 | Lo et al. |
| 2016/0217049 | A1 | 7/2016 | Bali et al. |
| 2017/0237490 | A1 | 8/2017 | Qin et al. |
| 2020/0183799 | A1 | 6/2020 | Riedy et al. |

OTHER PUBLICATIONS

F. Biwu, et al., "Reliability Evaluation of Optical Fiber Protection Channels based on Practical Coding and Logical calculation", Applied Mechanics and Materials vols. 752-753 (2015) pp. 1146-1152.

List of IBM Patents and Patent Applications Treated as Related, dated Dec. 10, 2018, pp. 2.

B. Dufrasne, et al., "IBM DS8880 Architecture and Implementation (Release 8.5)," International Business Machines Corporation, Document No. SG24-8323-04, Aug. 2018, pp. 514.

U.S. Appl. No. 16/213,802, filed Dec. 7, 2018.

Office Action dated Jan. 7, 2020, pp. 16, for U.S. Appl. No. 16/213,802.

Response dated Apr. 7, 2020, pp. 8, to Office Action dated Jan. 7, 2020, pp. 16, for U.S. Appl. No. 16/213,802.

Office Action dated Jun. 29, 2020, pp. 16, for U.S. Appl. No. 16/213,802.

Final Office Action dated Nov. 30, 2020, pp. 36, for U.S. Appl. No. 16/213,802.

Response dated Sep. 29, 2020, pp. 10, to Office Action dated Jun. 29, 2020, pp. 16, for U.S. Appl. No. 16/213,802.

Response dated Mar. 1, 2021, pp. 11, to Final Office Action dated Nov. 30, 2020, pp. 36, for U.S. Appl. No. 16/213,802.

U.S. Appl. No. 17/476,171, filed Sep. 15, 2021.

Preliminary Amendment dated Sep. 15, 2021, pp. 22, for U.S. Appl. No. 17/476,171.

List of IBM Patents and Applications Treated as Related, dated Oct. 26, 2021, pp. 2.

Notice of Allowance dated Jul. 22, 2021, pp. 18, for U.S. Appl. No. 16/213,802.

* cited by examiner

COMMUNICATION OF DIAGNOSTIC PARAMETERS OF A DATA MIRRORING CONFIGURATION FROM A STORAGE CONTROLLER TO A HOST

BACKGROUND

1. Field

Embodiments relate to the communication of diagnostic parameters of a data mirroring configuration from a storage controller to a host.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts. A plurality of such storage controllers, hosts, and other computational devices may be deployed at one or more sites to provide an environment for storage and management of data and also to provide an environment for data processing. Further details of a storage controller and its operations with respect to a hosts and other devices may be found in the publication "IBM DS8880 Architecture and Implementation (Release 8.3)," published November 2017, by International Business Machines Corporation.

Communication between the hosts and the storage controller may occur over a Fibre Channel (FC) network, where Fibre Channel refers to an integrated set of architectural standards for data transfer being developed by the American National Standards Institute. Fibre Channel is a high-speed network technology primarily used for storage area networks (SAN). Fibre Channel Protocol (FCP) is a transport protocol that predominantly supports transport commands over Fibre Channel networks.

Fibre Channel may be split into five layers: a Protocol-mapping layer (FC-4), a common service layer (FC-3), a network layer (FC-2), a data link layer (FC-1), and a FC-0 layer that defines the physical link in the system, including the fibre, connectors, optical and electrical parameters for a variety of data rates. Layers FC-0 through FC-2 are also known as FC-PH, the physical layers of Fibre Channel, whereas FC-3 and FC-4 layers define how Fibre Channel ports interact with applications in computational devices. The FC-3 level of the FC standard is intended to provide the common services for features such as striping, multicasting, etc.

FC-4, the highest layer in Fibre Channel, defines the application interfaces that execute over Fibre Channel. FC-4 specifies the mapping rules of upper layer protocols using the FC layers below. FC-4 is formed by a series of profiles that define how to map legacy protocols to Fibre Channel. Fibre Channel is capable of transporting both network and channel information, and profiles for network and channel protocols, such as, Small Computer System Interface (SCSI), Intelligent Peripheral Interface (IPI), High Performance Parallel Interface (HIPPI) Framing Protocol, Internet Protocol (IP), Link Encapsulation (FC-LE), Single-Byte Command Code Set Mapping (SBCCS), etc., may be specified or proposed as protocol mappings in FC-4.

A Storage Area Network (SAN) is a high speed communication network or a subnetwork for transferring data between at least two computational devices. For example a SAN may establish a coupling between a host computational system and a storage controller through Fiber Channel (FC) switches. Fibre Connection (FICON) is a protocol of the Fibre Channel architecture and may also be referred to by the formal names of FC-SB-6, FC-SB-5, and other formal names used in other previously adopted FICON protocols. A channel is a direct or a switched point-to-point connection between communicating devices. In the Fibre Channel architecture, a FICON channel may perform the functions specified by FC-SB-6 or FC-SB-5 or other previously adopted FICON protocols to provide access to Input/Output (I/O) devices by means of control units or emulated control units. FICON channels may rely on packet switching for transferring data between communicating devices. In the Fibre Channel architecture, the term Fibre Channel Protocol (FCP) may refer to the interface protocol for SCSI, or the FC-4 mapping, where FC-4 comprises a protocol-mapping layer, in which upper level protocols such as small computer system interface (SCSI), FICON, etc. are encapsulated into Information Units (IUs) for delivery to FC-2. FC-4s may include FCP-4, FC-SB-5, FC-SB-6, etc. FCP channels may also be used in Fibre channel storage area networks in addition to or instead of FICON channels.

FC interfaces communicate according to FC protocol standards, which govern how signals are transmitted over various transmission media including fiber optic cable or twisted pair copper cables, etc. In some configurations, FC interfaces further communicate according to Fibre Channel over the Ethernet (FCoE) protocol standards, which encapsulates Fibre Channel (FC) frames in Ethernet frames to allow an Ethernet network to communicate with low latency, high performance networks, such as Fibre Channel.

Fibre Channel storage area networks may use the Fibre Channel protocol (used by the hardware to communicate), the SCSI protocol (used by software applications to communicate to disks), and other protocols for communication. In Fibre channel, network connections are established between node ports (N_Ports) that are there in computers, servers, storage controllers, storage devices, printers, etc., and fabric ports (F_Ports) that are there in the Fibre channel switched fabric. A Fibre Channel switched fabric relies on one or more switches to establish direct, point-to-point connections between the source and target devices. Each Fibre Channel interface chip in the host bus adapters of the storage controller comprises a port that allows communication of the storage controller to the hosts over the Fibre Channel switched fabric.

Peer to Peer Remote Copy or PPRC is a protocol to replicate a storage volume from one storage controller to another storage controller in a remote site. Synchronous PPRC causes each write to the primary volume to be performed to the secondary volume as well, and the input/output (I/O) is only considered complete when updates to both primary and secondary storage controllers have completed. PPRC is a type of remote mirroring solution.

U.S. Pat. No. 9,667,476 describes a secure method for host operating system that executes in the host to obtain the Fiber Channel diagnostic parameters for a storage area network. U.S. Pat. No. 9,077,448 describes a method for monitoring a stage of an optical link in a Fibre Channel infrastructure and includes sending an Extended Link Service (ES) request to read an optical power of the optical link, and diagnosing a degradation of the optical link, based on a response to the ELS request.

US patent publication 20160217049 describes methods, storage arrays and computer readable media for triggering a failover between an active controller and a standby controller of a storage array. U.S. Pat. No. 9,965,200 patent describes a management framework providing an easy to use and read graphical perspective that allows analysis of faults in a multi-path storage environment. US patent publication 20170237490 describes a high-speed optical module for an optical fiber channel. U.S. Pat. No. 7,143,008 describes a method of collecting and storing storage network performance information that allows tracking of the cause of application performance deterioration. U.S. Pat. No. 8,060,650 describes storage network architectures and methods for diagnosing a path in a storage network. U.S. Pat. No. 6,961,767 patent describes a fiber channel analyzer for analyzing the operation of a fiber channel arbitrated loop (FC-AL) to which a plurality of devices are connectable.

SUMMARY OF THE PREFERRED EMBODIMENTS

Provided are a method, system, and computer program product in which a storage controller is configured to communicate with a host over a first storage area network. Data controlled via the storage controller is mirrored to another storage controller over a second storage area network. The storage controller receives a request from the host to provide read diagnostic parameters of the second storage area network. In response to receiving the request, the storage controller secures the read diagnostic parameters of the second storage area network. The storage controller transmits the read diagnostic parameters of the second storage area network to the host. As a result, a storage controller is able to return read diagnostic parameters of a storage area network that allows the performing of the mirroring of data.

In additional embodiments, the storage controller isolates the second storage area network from the host and does not permit the host to directly secure read diagnostic parameters of the second storage area network without transmitting the request from the host to the storage controller to provide read diagnostic parameters of the second storage area network. As a result, read diagnostic parameters of isolated networks are made available to a host.

In further embodiments, the storage controller is a first storage controller and the another storage controller is a second storage controller, wherein the second storage area network is comprised of a plurality of storage area networks, wherein a plurality of paths through the plurality of storage area networks are available to be used for mirroring the data controlled by the first storage controller to the second storage controller, and wherein the securing and transmitting by the storage controller of the read diagnostic parameters of the second storage area network to the host comprises including read diagnostic parameters of all of the plurality of paths that are available to be used for mirroring the data controlled by the first storage controller to the second storage controller. As a result, read diagnostic parameters of multiple paths are determined.

In certain embodiments, the read diagnostic parameters of all of the plurality of paths indicate that a first path of the plurality of paths provides a superior communication path than a second path of the plurality of paths for the mirroring of the data. As a result, superior paths may be chosen over inferior paths.

In additional embodiments, the first storage area network and the second storage area network use a Fibre Channel (FC) protocol, wherein Extended Link Services (ELS) commands over FC allow the host to acquire read diagnostic parameters of the first storage area network but not of the second storage area network. As a result, certain embodiments may be implemented in Fibre Channel networks.

In certain embodiments, the read diagnostic parameters allow fault isolation in the second storage area network. As a result, faults may be determined in a SAN.

In further embodiments, the storage controller is a first storage controller and the another storage controller is a second storage controller, wherein the mirroring is via synchronous replication in which a write from the host is complete only after the write is completed on volumes of both the first and the second storage controller. As a result, improved mechanisms for sharing of read diagnostic information is performed.

In additional embodiments, an operating system of the host includes a command that is configurable to generate the request to provide read diagnostic parameters, wherein additional storage area networks are also used for mirroring of data, and wherein different ports are used for mirroring of data within a same storage area network. As a result, extraction of read diagnostic parameters from isolated networks is performed by generating a response to operating system based commands.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

A data mirroring solution may be used to mirror (i.e., duplicate) data from storage controlled by a first storage controller to storage controlled by second storage controller. Certain mirroring solutions may provide real-time mirroring of logical storage volumes between two storage controllers, where the logical storage volumes may be located at different geographical sites (e.g. separated by over 10 kilometers) referred to as a local site and a remote site, where volumes are mirrored from the local site to the remote site. In certain embodiments, the mirroring is a synchronous copy solution in which a write operation is carried out on both copies, at the local and remote sites, before the write operation is considered complete. The first storage controller and the second storage controller may be coupled via a SAN that is Fibre Channel based.

Certain embodiments provide mechanisms in which a host is able to secure Fibre Channel diagnostic parameters for not only a first SAN that couples the host to storage controllers, but also the Fibre Channel diagnostic parameters for a second SAN that couples two storage controllers that are being mirrored via a data mirroring solution. The second SAN is isolated from the first SAN via the storage controllers. Such mechanisms improve computer technology by allowing the diagnostic parameters of the second SAN that is used to perform mirroring operations between storage controllers to be made available to the host via the first SAN, even though the second SAN is isolated from the first SAN.

Exemplary Embodiments

Figure 1:
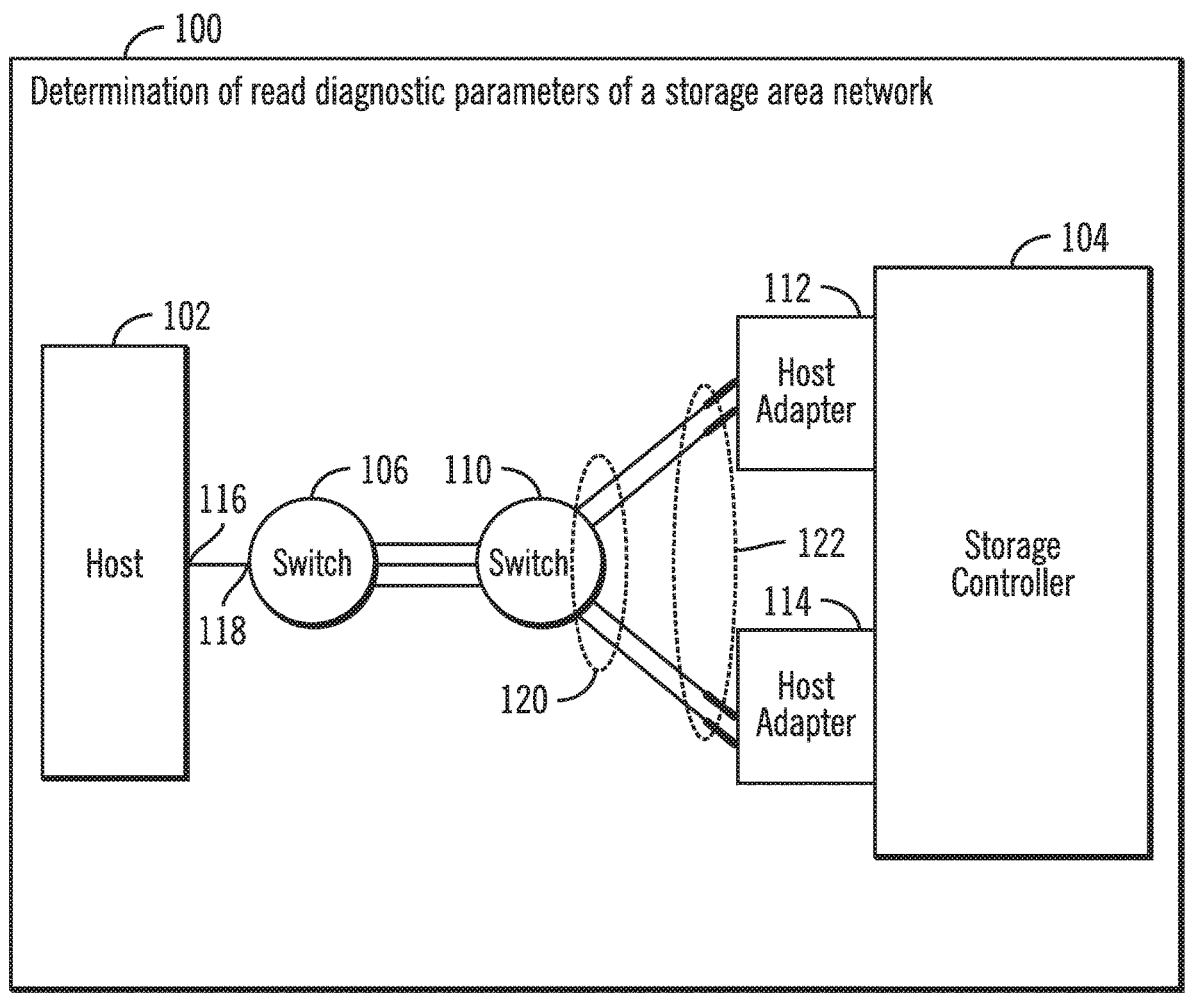
FIG. 1 illustrates a block diagram that shows determination of read diagnostic parameters of a storage area network (SAN), in accordance with certain embodiments.

FIG. 1 illustrates a block diagram 100 that shows determination of read diagnostic parameters of a storage area network (SAN), in accordance with certain embodiments.

A host 102 is coupled to a storage controller 104 via one or more switches 106, 110 that in certain embodiments may comprise Fibre Channel switches. Host adapters 112, 114 are used to couple the storage controller 104 to the switch 110.

Fibre channel based read diagnostic parameters (RDP) extended link services (ELS) allows the host 102 to retrieve diagnostic instrumentation data from the visible ports (shown via reference numerals 116, 118, 120. 122) of the storage area network comprised of the switches 106, 110, and the connections to the host 102 and the storage controller 104. The Extended Link Service is used in order to solicit a destination port to perform a link-level function or service. In this case, the RDP ELS requests a port to return the identified diagnostic parameters associated with the port identifier specified in the payload of the request. This provides the port transmitting the request with information that may be used for diagnosis of link or port related errors, or degraded conditions associated with the designated port. U.S. Pat. No. 9,667,476 describes further details of how the to obtain the Fiber channel diagnostic data for a SAN. This diagnostic data (RDP data) allows determination of the status of paths in a SAN without the need to run around a data center and insert light meters to diagnose faulty connections. Instead, the diagnostic parameters are read in-band, without disruption to the production work, and this allows fault isolation, problem determination, etc.

In FIG. 1, Fibre channel commands allow the host operating system of the host 102 to retrieve the diagnostic data of the SAN coupling the host 102 to the storage controller 104. However, diagnostic data for SANs for synchronous replication technologies that are hidden by the storage controller 104 from the host 102 cannot be retrieved by the RDP ELS mechanisms.

Figure 2:
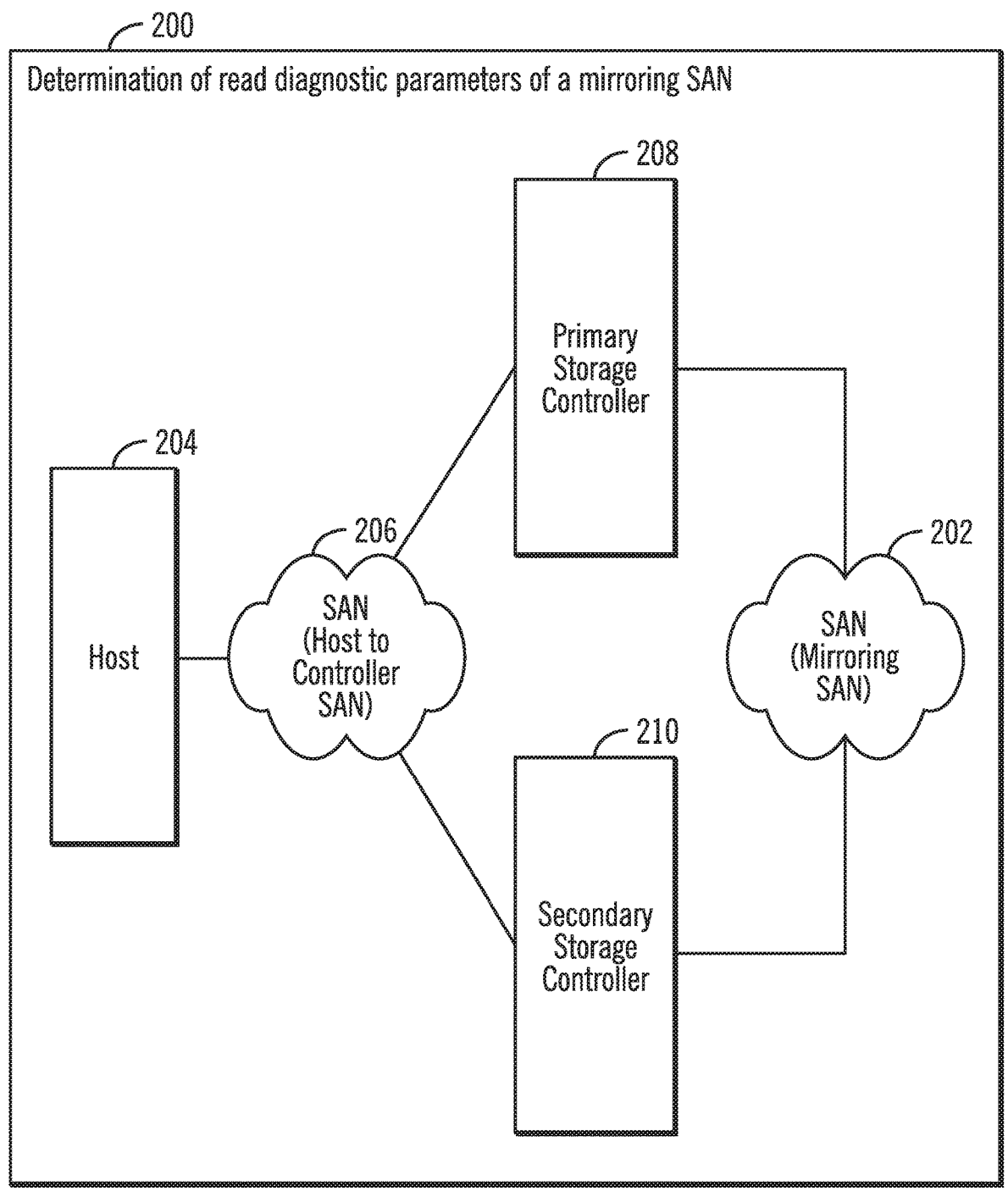
FIG. 2 illustrates a block diagram that shows the determination of read diagnostic parameters of a mirroring SAN, in accordance with certain embodiments.

FIG. 2 illustrates a block diagram 200 that shows the determination of read diagnostic parameters of a mirroring SAN 202, in accordance with certain embodiments.

A host 204 is coupled via SAN 206 to a primary storage controller 208 and a secondary storage controller 210, wherein the SAN 206 is referred to as a host to controller SAN. Data is synchronously replicated between the primary storage controller 208 and the secondary storage controller 210 via SAN 202 which is referred to as the mirroring SAN.

The storage controllers 208, 210 and the host 204 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The SANs 202, 206 may use a fabric topology, such as a Fibre Channel fabric, which is an infrastructure specially designed to handle storage communications. It provides faster and more reliable access than higher level protocols used in other types of networks, such as network attached storage (NAS). A fabric is similar in concept to a network segment in a local area network. A typical Fibre Channel SAN fabric is made up of a number of Fibre Channel switches, interconnected by various links.

In certain embodiments, the storage controllers 208, 210 isolate the mirroring SAN 202 from the host to controller SAN 206. As a result, while the host 204 is able to directly secure the read diagnostic parameters of the host to controller SAN 206, the host 204 is unable to secure the read diagnostic parameters of the mirroring SAN 202 except via the storage controllers 208, 210.

The storage controllers 208, 210 are configured to receive input/output (I/O) requests from the hosts 204 and provide access to a plurality of storage devices. The storage controllers 208, 210 allow the host 204 to perform input/output (I/O) operations with logical storage maintained by the storage controllers 208, 210. The physical storage corresponding to the logical storage may be found in one or more of the storage devices of the storage controllers 208, 210.

Figure 3:
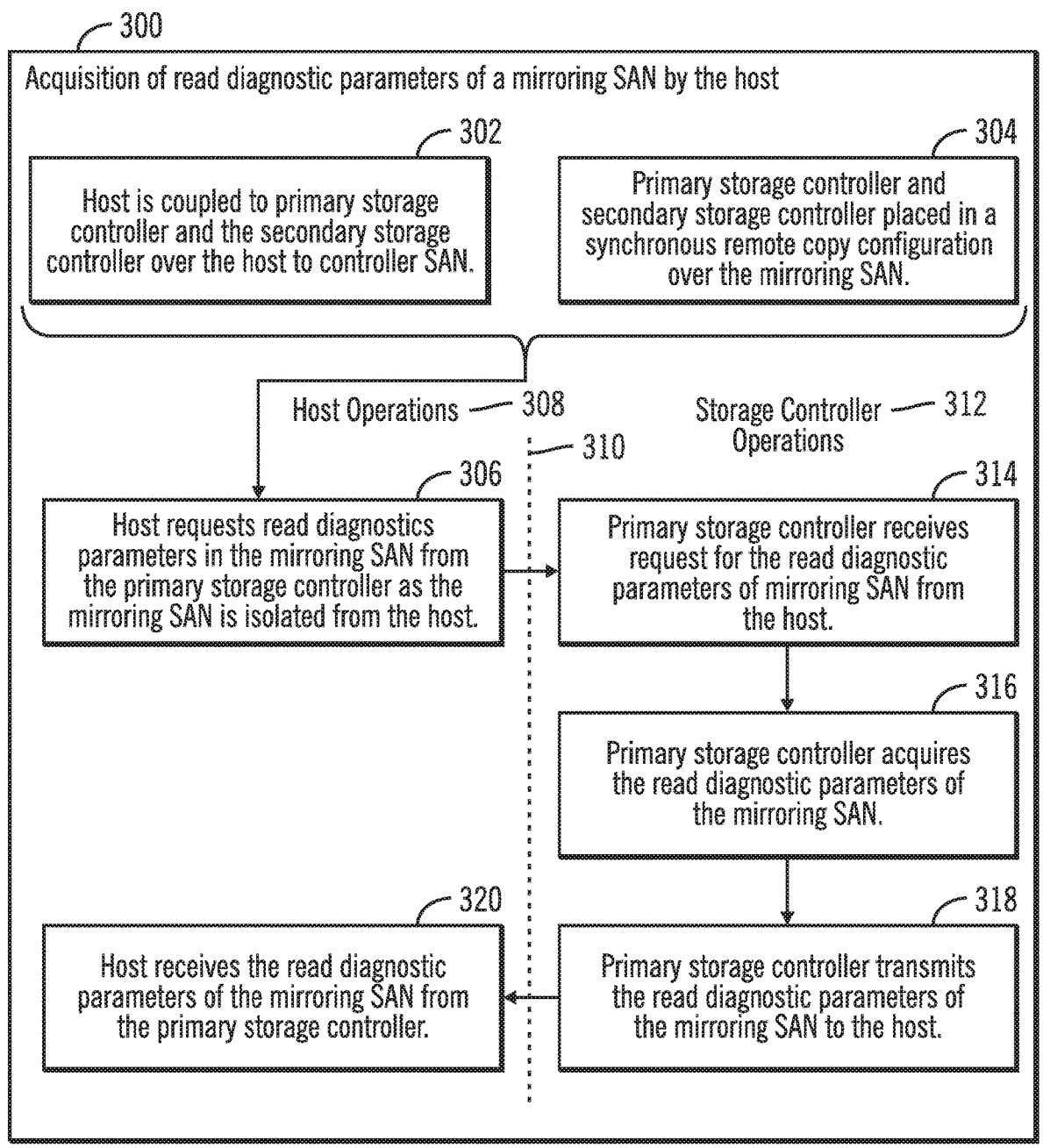
FIG. 3 illustrates a flowchart that shows acquisition of read diagnostic parameters of a mirroring SAN by the host, in accordance with certain embodiments.

FIG. 3 illustrates a flowchart 300 that shows acquisition of read diagnostic parameters of a mirroring SAN 202 by the host 204 in accordance with certain embodiments.

Control starts at block 302 and block 304 that are performed in parallel. In block 302, the host 204 is coupled to the primary storage controller 208 and the secondary storage controller 210 over the host to controller SAN 206. The primary storage controller 208 and the secondary storage controller 210 are placed in a synchronous remote copy configuration over the mirroring SAN 202 (at block 304).

Control proceeds to block 306 in which the host 204 requests read diagnostics parameters in the mirroring SAN 202 from the primary storage controller 208 (or in alternative embodiments from the secondary storage controller 210) as the mirroring SAN 202 is isolated from the host 204. The host operations (shown via reference numeral 308) are shown to the left of dashed lines 310 and the storage controller operations 212 are shown to the right of the dashed line 310.

From block 306 control proceeds to block 314 in which the primary storage controller 208 receives the request for the read diagnostic parameters of the mirroring SAN 202 from the host 204. Control proceeds to block 316 in which the primary storage controller 208 acquires the read diagnostic parameters of the mirroring SAN 202, and then transmits (at block 318) the read diagnostic parameters of the mirroring SAN to the host 204.

From block 318 control proceeds to block 320 in which the host 204 receives the read diagnostic parameters of the mirroring SAN 202 from the primary storage controller 208. As a result, the embodiments shown in FIG. 3 allows the host 204 to determine the read diagnostic parameters of the mirroring SAN 202 by sending a request to one of the storage controllers 208, 210. The status of the paths in the mirroring SAN 202 are thus made available to the host 204 by the storage controllers 208, 210 in response to a request from the host 204.

Figure 4:
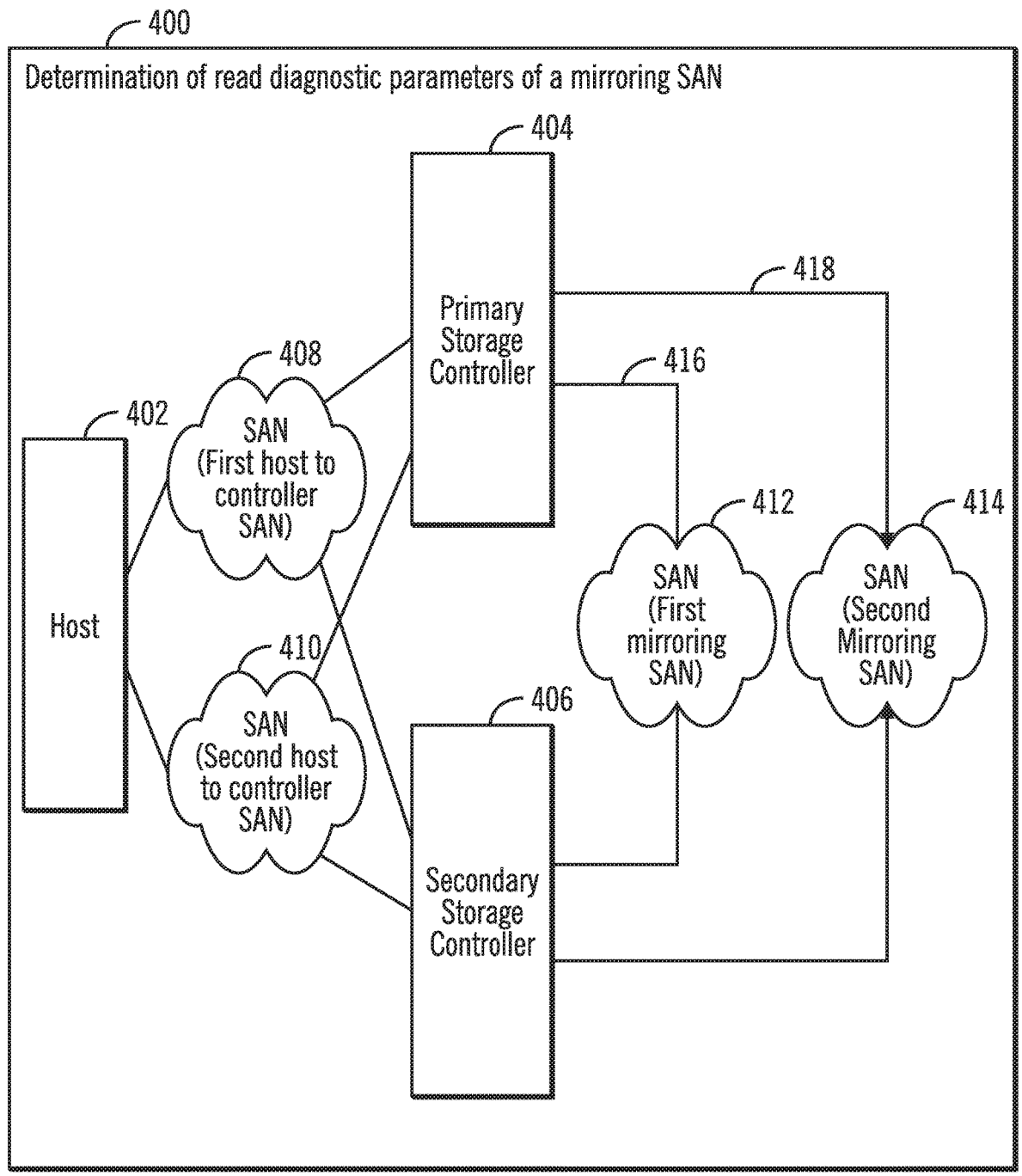
FIG. 4 illustrates a block diagram that shows the determination of read diagnostic parameters of a plurality of paths in a mirroring SAN, in accordance with certain embodiments.

FIG. 4 illustrates a block diagram 400 that shows the determination of read diagnostic parameters of a plurality of paths in a mirroring SAN comprised of a plurality of SANs, in accordance with certain embodiments.

A host 402 is coupled to a primary storage controller 404 and a secondary storage controller 406 over a plurality of SANs 408, 410. SAN 408 is referred to as a first host to controller SAN and SAN 410 is referred to as a second host to controller SAN.

The primary storage controller 404 and the secondary storage controller 406 are in a synchronous peer to peer remote copy relationship over the plurality of SANs 412, 414. SAN 412 is referred to as a first mirroring SAN and SAN 414 is referred to as a second mirroring SAN 414.

The first mirroring SAN 412 and the second mirroring SAN are isolated from the host 402 by the storage controller 404, 406. Without enhancements, the RDP ELS mechanisms cannot be used by the host 402 to secure the read diagnostic parameters of the first mirroring SAN 412 or the second mirroring SAN 414. The host 402 is of course able to secure the read diagnostic parameters of the host to controller SANs 408, 410.

In certain embodiments, the host 402 sends a request one of the storage controllers 404, 406 to secure read diagnostic parameters of the SANs 412, 414 and the storage controller returns the read diagnostic parameters of the SANs 412, 414 having a plurality of paths 416, 418 to the host 402.

Figure 5:
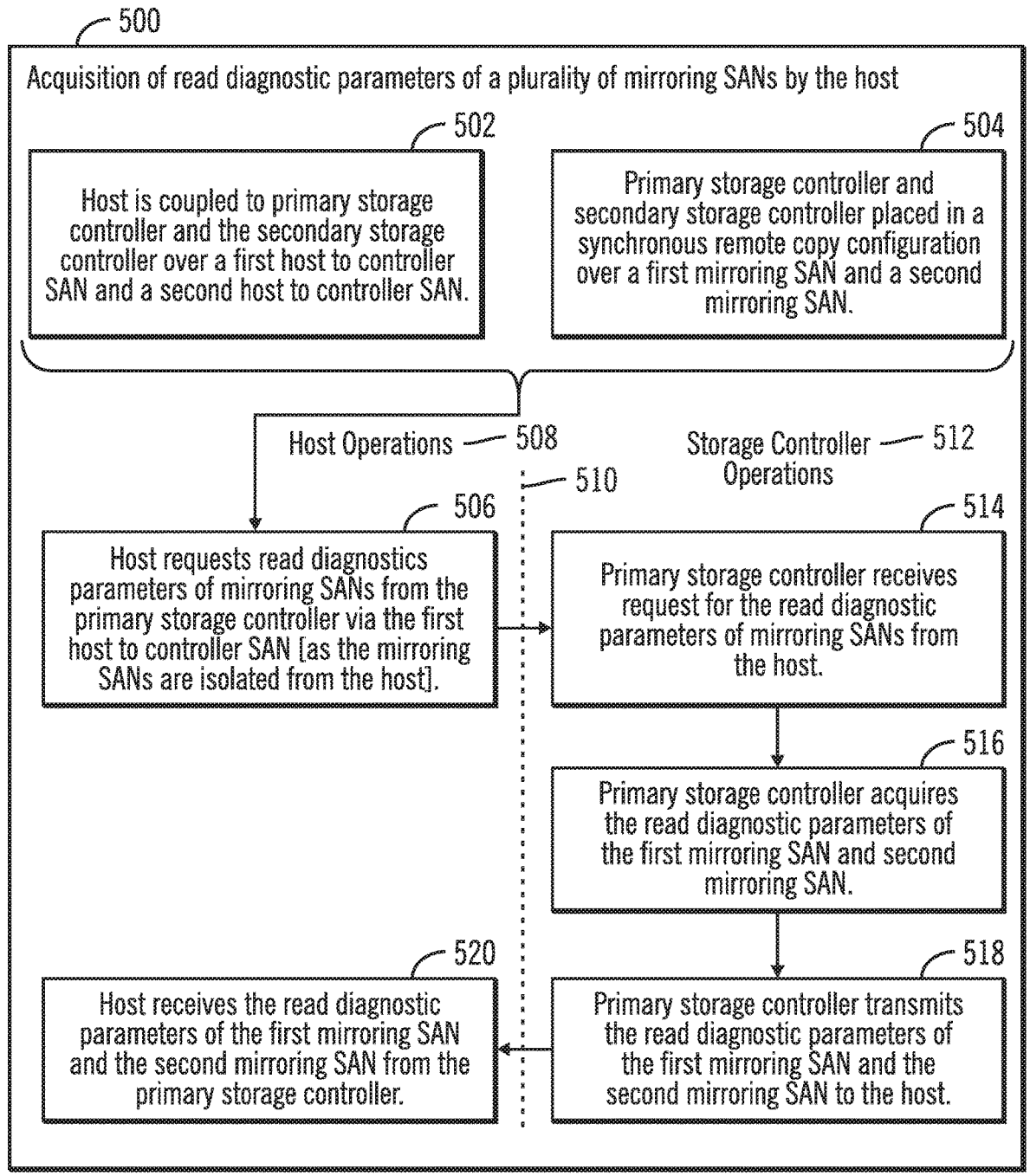
FIG. 5 illustrates a flowchart that shows acquisition of read diagnostic parameters of a plurality of mirroring SANs by the host, in accordance with certain embodiments.

FIG. 5 illustrates a flowchart 500 that shows acquisition of read diagnostic parameters of a plurality of mirroring SANs 412, 414 by the host 402, in accordance with certain embodiments.

Control starts at block 502 and block 504 that are performed in parallel. In block 502 the host 402 is coupled to the primary storage controller 404 and the secondary storage controller 406 over the host to controller SANs 408, 410. The primary storage controller 404 and the secondary storage controller 406 are placed in a synchronous remote copy configuration over the mirroring SANs 412, 414 (at block 504).

Control proceeds to block 506 in which the host 402 requests read diagnostics parameters in the mirroring SANs 412, 414 from the primary storage controller 404 (or in alternative embodiments from the secondary storage controller 406) as the mirroring SANs 412, 414 are isolated from the host 402. The host operations (shown via reference numeral 508) are shown to the left of dashed lines 510 and the storage controller operations 512 are shown to the right of the dashed line 510

From block 506 control proceeds to block 514 in which the primary storage controller 404 receives the request for the read diagnostic parameters of the mirroring SANs 412, 414 from the host 402. Control proceeds to block 516 in which the primary storage controller 404 acquires the read diagnostic parameters of the mirroring SANs 412, 414 including the paths 416, 418, and then transmits (at block 518) the read diagnostic parameters of the mirroring SANs 412, 414 including the paths 416, 418 to the host 204.

From block 518 control proceeds to block 520 in which the host 402 receives the read diagnostic parameters of the mirroring SANs 412, 414 including the paths 416, 418 from the primary storage controller 404. As a result, the embodiments shown in FIG. 5 allows the host 402 to determine the read diagnostic parameters of the mirroring SANs 412, 414 by sending a request to one of the storage controllers 404, 406. The status of the paths 416, 418 in the mirroring SAN 412, 414 are thus made available to the host 402 by the storage controller 404, 406 in response to a request from the host 402.

Figure 6:
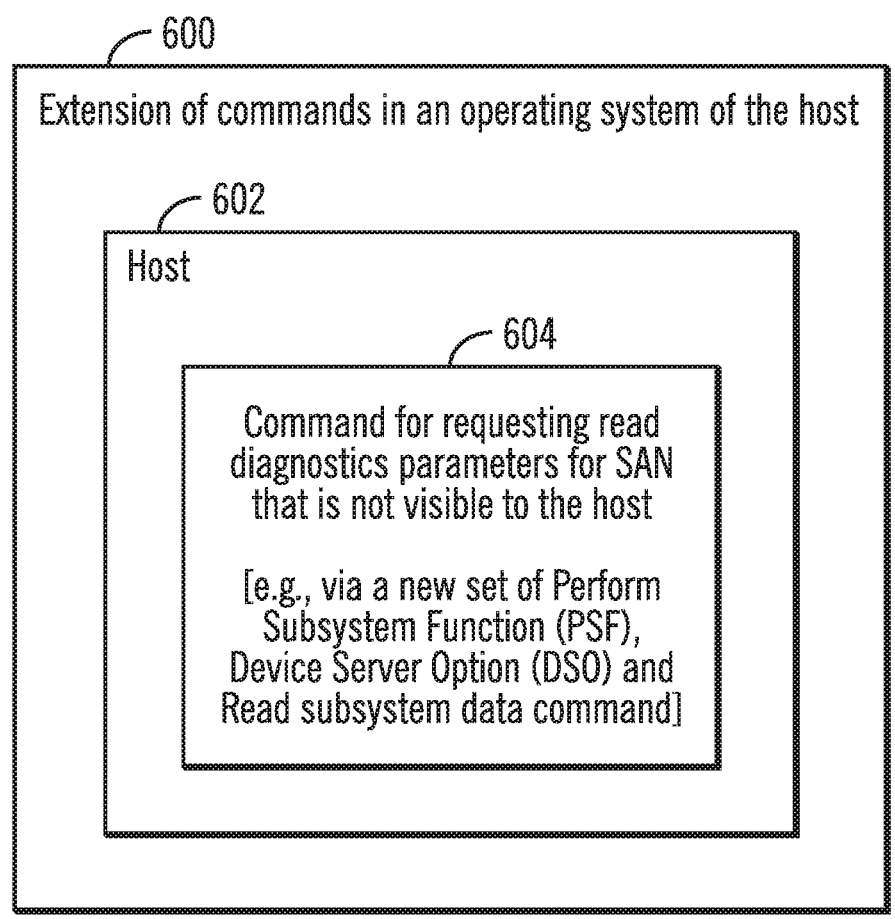
FIG. 6 illustrates a block diagram that shows the extension of commands in an operating system of the host, in accordance with certain embodiments.

FIG. 6 illustrates a block diagram 600 that shows the extension of commands in an operating system of the host 602, in accordance with certain embodiments.

Block 604 shows a command for requesting read diagnostic parameters for SAN that is not visible to a host. The command may be a new set of Perform Subsystem Function (PSF), Device Server Option (DSO) and read subsystem data command in the IBM z/OS* operating system.

Figure 7:
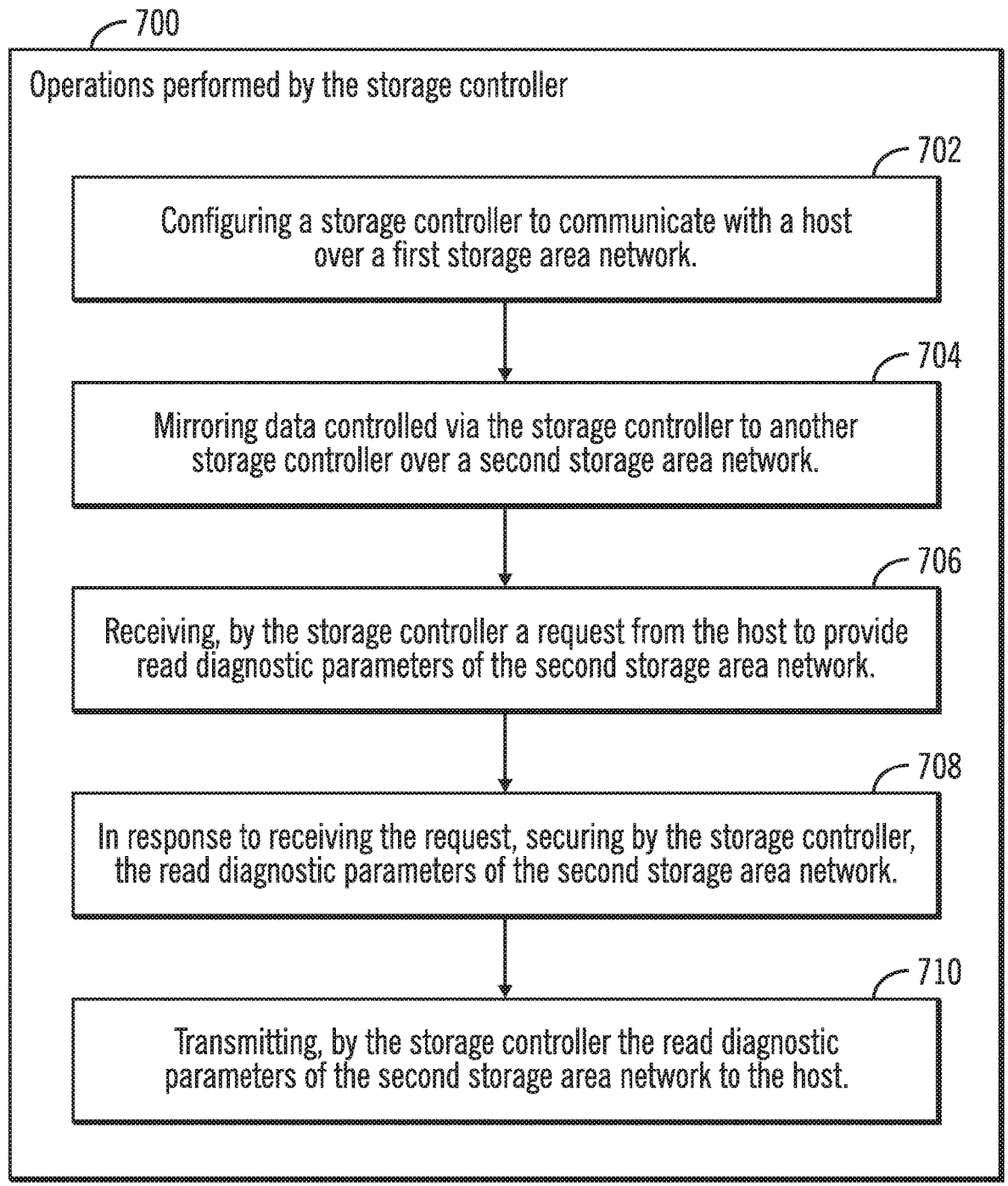
FIG. 7 illustrates a flowchart that shows operations performed by the storage controller, in accordance with certain embodiments.

FIG. 7 illustrates a flowchart that shows operations performed by the storage controller (e.g. storage controller 208, 210, 404, 406), in accordance with certain embodiments.

Control starts at block 702 in which a storage controller 208 is configured to communicate with a host 204 over a first storage area network 206. Data controlled via the storage controller 208 is mirrored (at block 704) to another storage controller 210 over a second storage area network 202. The storage controller 208 receives (at block 706) a request from the host 204 to provide read diagnostic parameters of the second storage area network 202. In response to receiving the request, the storage controller 208 secures (at block 708) the read diagnostic parameters of the second storage area network 202. The storage controller 208 then transmits (at block 710) the read diagnostic parameters of the second storage area network 202 to the host 204.

In further embodiments, the storage controller is a first storage controller 404 and the another storage controller is a second storage controller 406, wherein the second storage area network is comprised of a plurality of storage area networks 412, 414. A plurality of paths 416, 418 through the plurality of storage area networks 412, 414 are available to be used for mirroring the data controlled by the first storage controller 404 to the second storage controller, 406, wherein the securing and transmitting by the storage controller of the read diagnostic parameters of the second storage area network to the host comprises including read diagnostic parameters of all of the plurality of paths 416, 418 that are available to be used for mirroring the data controlled by the first storage controller 404 to the second storage controller 406. As a result, read diagnostic parameters of multiple paths are determined. In certain embodiments, the read diagnostic parameters of all of the plurality of paths 416, 418 indicate that a first path 416 of the plurality of paths provides a superior communication path than a second path 418 of the plurality of paths for the mirroring of the data. As a result, superior paths (e.g., the first path 416) may be chosen over inferior paths (e.g., the second path 418) for performing various operations.

Figure 8:
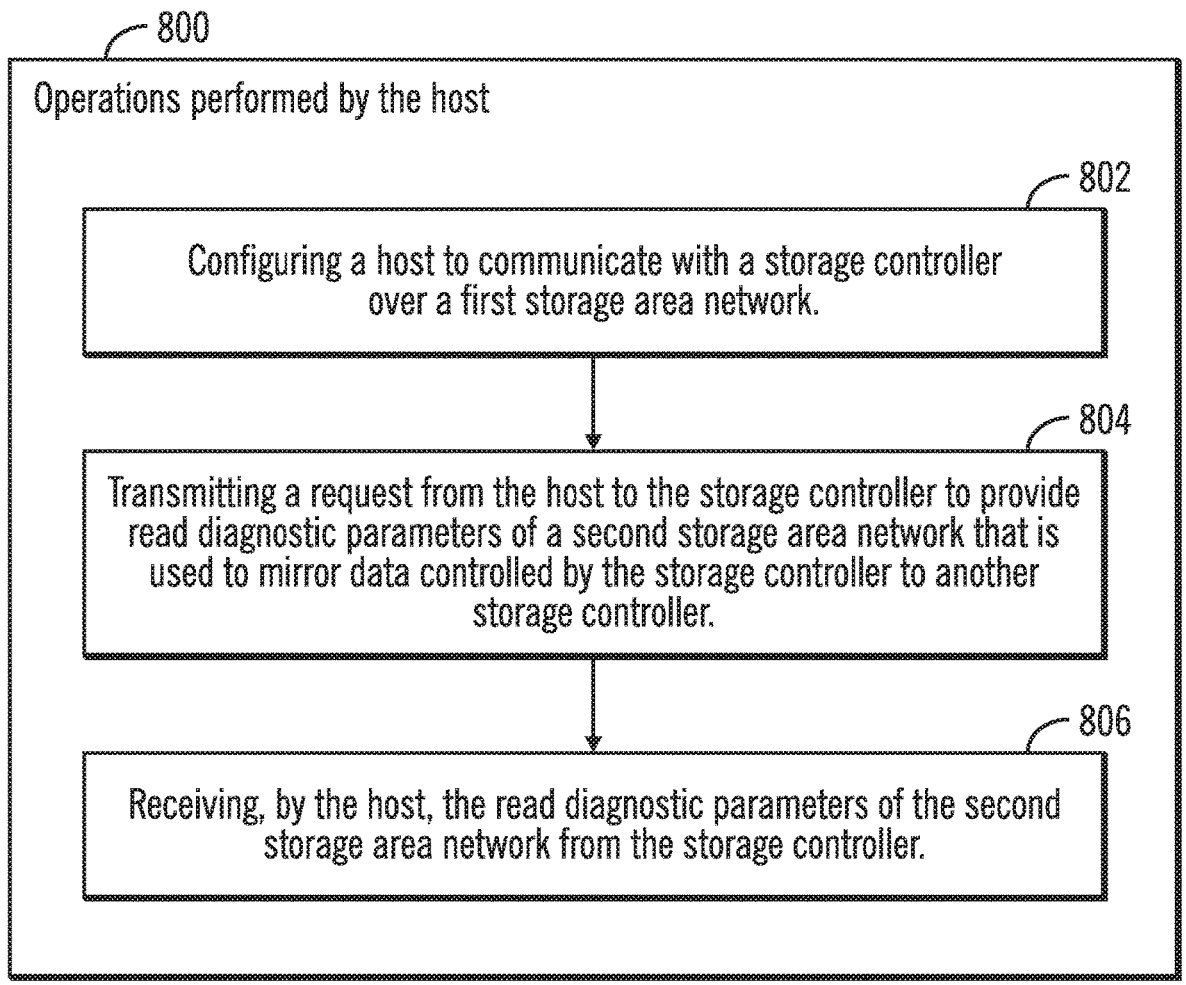
FIG. 8 illustrates a flowchart that shows operations performed by the host, in accordance with certain embodiments.

FIG. 8 illustrates a flowchart 800 that shows operations performed by the host 204 (or in alternative embodiments host 402), in accordance with certain embodiments.

Control starts at block 802 in which a host 204 is configured to communicate with a storage controller 208 over a first storage area network 206. Control proceeds to block 804, in which a request is transmitted from the host 204 to the storage controller 208 to provide read diagnostic parameters of a second storage area network 202 that is used to mirror data controlled by the storage controller 208 to another storage controller 210.

From block 804 control proceeds to block 806 in which the host 204 receives the read diagnostic parameters of the second storage area network 202 from the storage controller 208.

Therefore, FIGS. 1-8 illustrate certain embodiments, in which a host is able to receive the read diagnostic parameters for SANs that are isolated from the host, by sending a request to a storage controller that performs synchronous mirroring over the SANs.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
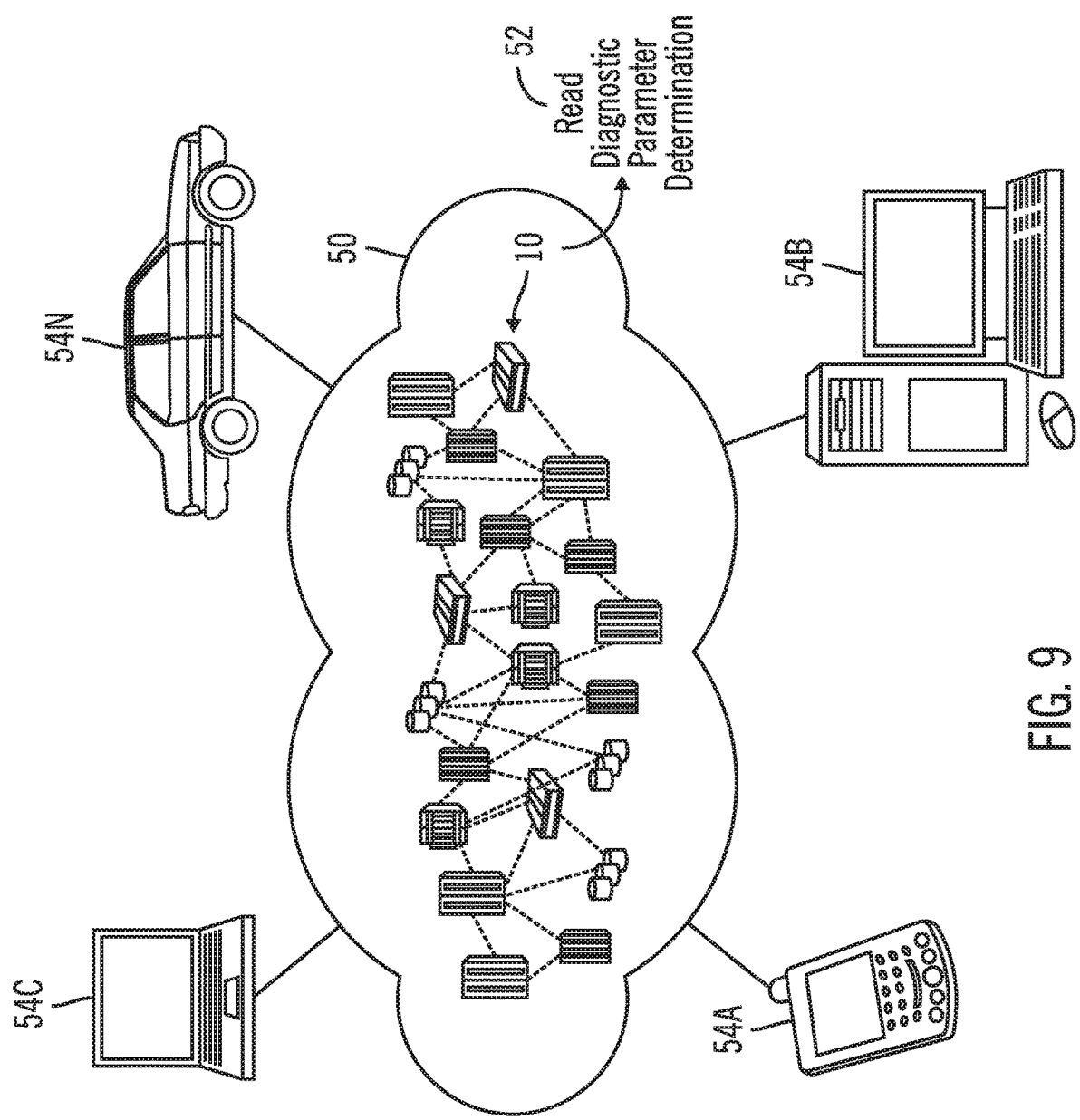
FIG. 9 illustrates a block diagram of a cloud computing environment for implementing the operations described in FIGS. 1-8, in accordance with certain embodiments.

Referring now to FIG. 9 an illustrative cloud computing environment 50 is depicted. Read diagnostic parameter determination (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
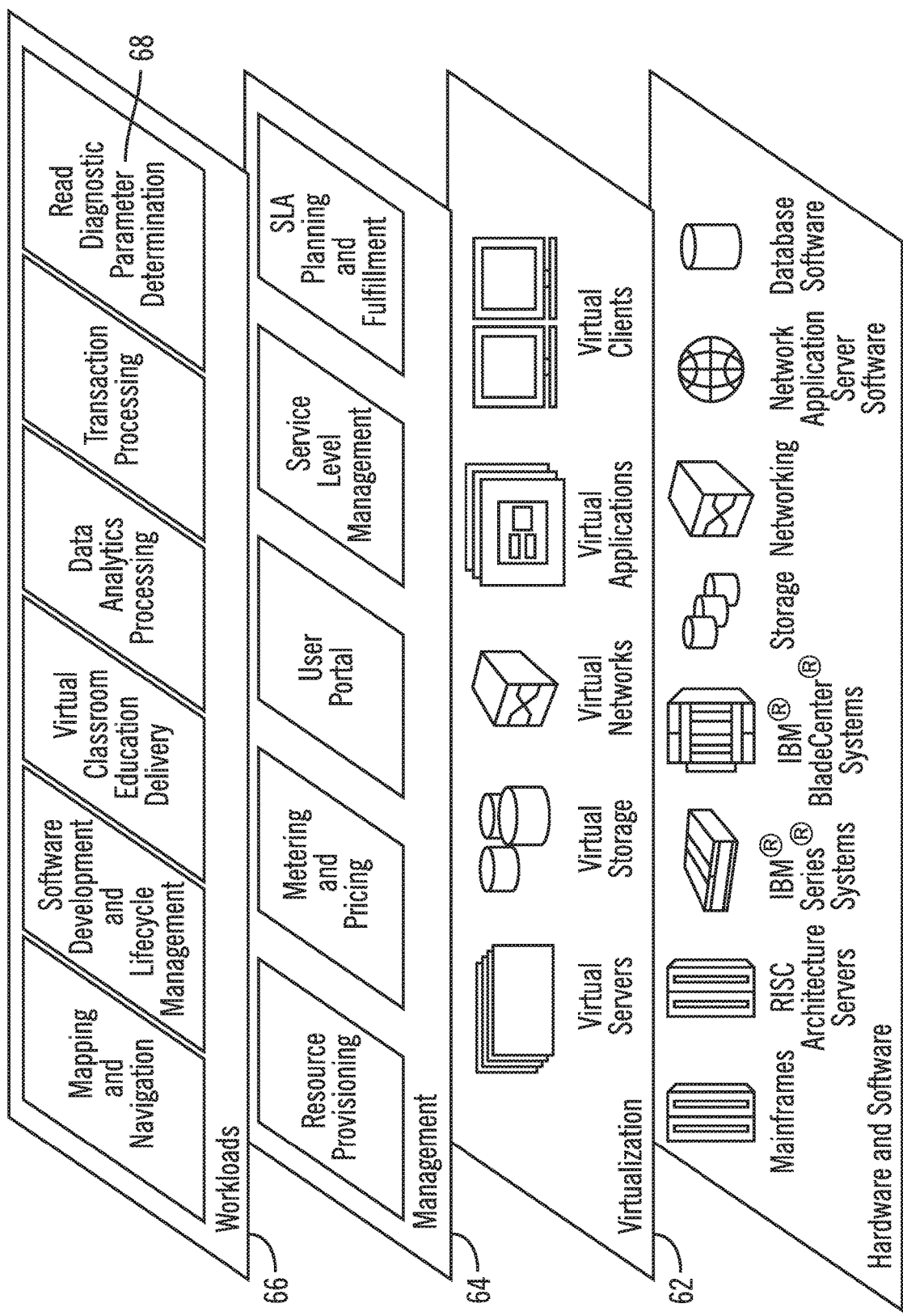
FIG. 10 illustrates a block diagram that shows further details of the cloud computing environment of FIG. 9, in accordance with certain embodiments.

Referring now to FIG. 10 a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and read diagnostic parameter determination 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
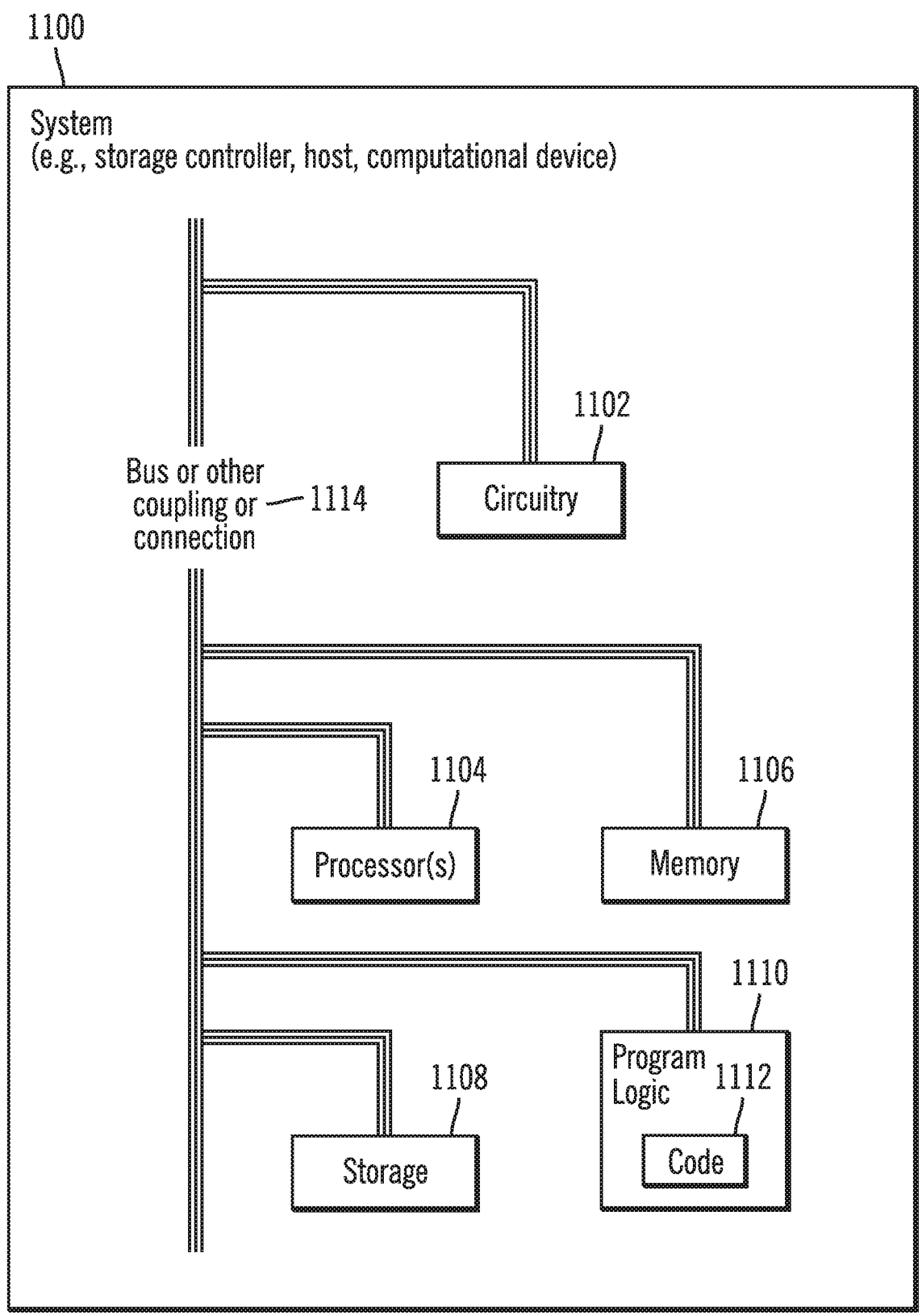
FIG. 11 illustrates a block diagram of a computational system, in accordance with certain embodiments.

FIG. 11 illustrates a block diagram that shows certain elements that may be included in the hosts or storage controllers or other computational devices shown in FIGS. 1-10 in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. While FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*IBM, ZSERIES, PSERIES, XSERIES, BLADECENTER, WEBSPHERE, DB2 and z/OS are trademarks or registered trademarks of International Business Machines Corporation registered in many jurisdictions worldwide.

What is claimed is:

1. A method, comprising:
configuring a first storage controller to communicate with a host over a first storage area network that is not isolated from the host;
performing a synchronous mirroring of data controlled via the first storage controller to a second storage controller over a second storage area network that is comprised of a plurality of storage area networks including a plurality of paths, wherein the second storage area network is isolated from the host, and wherein a first type of request comprising Extended Link Services (ELS) commands over a Fibre Channel (FC) protocol allows the host to acquire read diagnostic parameters of the first storage area network but not of the second storage area network, and diagnostic data for the synchronous mirroring that are hidden by the first storage controller from the host are prevented from being retrieved by the ELS commands over the FC protocol;
receiving, by the first storage controller a second type of request from the host to provide the read diagnostic parameters of the second storage area network, wherein the second type of request comprises a set of Perform Subsystem Function (PSF), Device Server Option (DSO) and a read subsystem data command that allow the host to receive the read diagnostic parameters of the second storage area network; and
in response to receiving the second type of request, transmitting, by the first storage controller to the host the read diagnostic parameters of the plurality of paths that are available to be used for the synchronous mirroring of the data controlled by the first storage controller to the second storage controller, wherein the read diagnostic parameters of the plurality of paths indicate that a first path of the plurality of paths provides a superior communication path than a second path of the plurality of paths for the mirroring of the data, wherein the first path that provides the superior communication path is chosen over the second path for performing selected operations, and wherein the first storage controller prevents the first type of request from securing the read diagnostic parameters of the plurality of paths but allows the second type of request to secure the read diagnostic parameters of the plurality of paths.

2. The method of claim 1, wherein the first storage controller isolates the second storage area network from the host and does not permit the host to directly secure read diagnostic parameters of the second storage area network without transmitting the second type of request from the host to the first storage controller to provide the read diagnostic parameters of the second storage area network.

3. The method of claim 1, the read diagnostic parameters allow fault isolation in the second storage area network.

4. The method of claim 1, wherein the synchronous mirroring is via synchronous replication in which a write from the host is complete only after the write is completed on volumes of both the first and the second storage controller.

5. The method of claim 1, wherein additional storage area networks are also used for the synchronous mirroring of the data, and wherein different ports are used for the mirroring of the data within a same storage area network.

6. The method of claim 1, wherein the second storage area network is comprised of a first mirroring storage area network that provides the first path from the first storage controller to the second storage controller, and a second mirroring storage area network that provides the second path from the first storage controller to the second storage controller, wherein the first mirroring storage area network synchronously mirrors data from the first storage controller to the second storage controller via the first path, and wherein the second mirroring storage area network synchronously mirrors data from the first storage controller to the second storage controller via the second path.

7. The method of claim 1, wherein FC commands used by the first type of request allows an operating system of the host to retrieve the read diagnostic parameters of the first storage area network coupling the host to the first storage controller, and wherein the second type of request uses an extension to the operating system of the host by using at least the PSF, the DSO and the read subsystem data command to retrieve the read diagnostic parameters of the first path and the second path.

8. The method of claim 1, wherein the set of PSF, SSO, Device Server Option (DSO) and the read subsystem data command is configured in an operating system in the second type of request to secure read diagnostic parameters for the second storage area network that is not visible to the host in the FC protocol, wherein the FC protocol is used by the first storage area network and the second storage area network.

9. A first storage controller, comprising:
a memory; and
a processor coupled to the memory, wherein the processor performs operations, the operations comprising:
configuring the first storage controller to communicate with a host over a first storage area network that is not isolated from the host;
performing a synchronous mirroring of data controlled via the first storage controller to a second storage controller over a second storage area network that is comprised of a plurality of storage area networks including a plurality of paths, wherein the second storage area network is isolated from the host, and wherein a first type of request comprising Extended Link Services (ELS) commands over a Fibre Channel (FC) protocol allows the host to acquire read diagnostic parameters of the first storage area network but not of the second storage area network, and diagnostic data for the synchronous mirroring that are hidden by the first storage controller from the host are prevented from being retrieved by the ELS commands over the FC protocol;
receiving, by the first storage controller a second type of request from the host to provide the read diagnostic parameters of the second storage area network, wherein the second type of request comprises a set of Perform Subsystem Function (PSF), Device Server Option (DSO) and a read subsystem data command that allow the host to receive the read diagnostic parameters of the second storage area network; and
in response to receiving the second type of request, transmitting, by the first storage controller to the host the read diagnostic parameters of the plurality of paths that are available to be used for the synchronous mirroring of the data controlled by the first storage controller to the second storage controller, wherein the read diagnostic parameters of the plurality of paths indicate that a first path of the plurality of paths provides a superior communication path than a second path of the plurality of paths for the mirroring of the data, wherein the first path that provides the superior communication path is chosen over the second path for performing selected operations, and wherein the first storage controller prevents the first type of request from securing the read diagnostic parameters of the plurality of paths but allows the second type of request to secure the read diagnostic parameters of the plurality of paths.

10. The first storage controller of claim 9, wherein the first storage controller isolates the second storage area network from the host and does not permit the host to directly secure read diagnostic parameters of the second storage area network without transmitting the second type of request from the host to the first storage controller to provide the read diagnostic parameters of the second storage area network.

11. The first storage controller of claim 9, the read diagnostic parameters allow fault isolation in the second storage area network.

12. The first storage controller of claim 9, wherein the synchronous mirroring is via synchronous replication in which a write from the host is complete only after the write is completed on volumes of both the first and the second storage controller.

13. The first storage controller of claim 9, wherein additional storage area networks are also used for the mirroring of the data, and wherein different ports are used for the synchronous mirroring of the data within a same storage area network.

14. The first storage controller of claim 9, wherein the second storage area network is comprised of a first mirroring storage area network that provides the first path from the first storage controller to the second storage controller, and a second mirroring storage area network that provides the second path from the first storage controller to the second storage controller, wherein the first mirroring storage area network synchronously mirrors data from the first storage controller to the second storage controller via the first path, and wherein the second mirroring storage area network synchronously mirrors data from the first storage controller to the second storage controller via the second path.

15. The first storage controller of claim 9, wherein FC commands used by the first type of request allows an operating system of the host to retrieve the read diagnostic parameters of the first storage area network coupling the host to the first storage controller, and wherein the second type of request uses an extension to the operating system of the host by using at least the PSF, the DSO and the read subsystem data command to retrieve the read diagnostic parameters of the first path and the second path.

16. The first storage controller of claim 9, wherein the set of PSF, SSO, Device Server Option (DSO) and the read subsystem data command is configured in an operating system in the second type of request to secure read diagnostic parameters for the second storage area network that is not visible to the host in the FC protocol, wherein the FC protocol is used by the first storage area network and the second storage area network.

17. A computer program product, the computer program product comprising a computer readable storage medium having computer readable program code embodied therewith, the computer readable program code configured to perform operations, the operations comprising:
configuring a first storage controller to communicate with a host over a first storage area network that is not isolated from the host;

performing a synchronous mirroring of data controlled via the first storage controller to a second storage controller over a second storage area network that is comprised of a plurality of storage area networks including a plurality of paths, wherein the second storage area network is isolated from the host, and wherein a first type of request comprising Extended Link Services (ELS) commands over a Fibre Channel (FC) protocol allows the host to acquire read diagnostic parameters of the first storage area network but not of the second storage area network, and diagnostic data for the synchronous mirroring that are hidden by the first storage controller from the host are prevented from being retrieved by the ELS commands over the FC protocol;

receiving, by the first storage controller a second type of request from the host to provide the read diagnostic parameters of the second storage area network, wherein the second type of request comprises a set of Perform Subsystem Function (PSF), Device Server Option (DSO) and a read subsystem data command that allow the host to receive the read diagnostic parameters of the second storage area network; and in response to receiving the second type of request, transmitting, by the first storage controller to the host the read diagnostic parameters of the plurality of paths that are available to be used for the synchronous mirroring of the data controlled by the first storage controller to the second storage controller, wherein the read diagnostic parameters of the plurality of paths indicate that a first path of the plurality of paths provides a superior communication path than a second path of the plurality of paths for the mirroring of the data, wherein the first path that provides the superior communication path is chosen over the second path for performing selected operations, and wherein the first storage controller prevents the first type of request from securing the read diagnostic parameters of the plurality of paths but allows the second type of request to secure the read diagnostic parameters of the plurality of paths.

18. The computer program product of claim 17, wherein the first storage controller isolates the second storage area network from the host and does not permit the host to directly secure read diagnostic parameters of the second storage area network without transmitting the second type of request from the host to the first storage controller to provide the read diagnostic parameters of the second storage area network.

19. The computer program product of claim 17, wherein the synchronous mirroring is via synchronous replication in which a write from the host is complete only after the write is completed on volumes of both the first and the second storage controller.

20. The computer program product of claim 17, wherein additional storage area networks are also used for the mirroring of the data, and wherein different ports are used for the synchronous mirroring of the data within a same storage area network.

21. The computer program product of claim 17, wherein the second storage area network is comprised of a first mirroring storage area network that provides the first path from the first storage controller to the second storage controller, and a second mirroring storage area network that provides the second path from the first storage controller to the second storage controller, wherein the first mirroring storage area network synchronously mirrors data from the first storage controller to the second storage controller via the first path, and wherein the second mirroring storage area network synchronously mirrors data from the first storage controller to the second storage controller via the second path.

22. The computer program product of claim 17, wherein FC commands used by the first type of request allows an operating system of the host to retrieve the read diagnostic parameters of the first storage area network coupling the host to the first storage controller, and wherein the second type of request uses an extension to the operating system of the host by using at least the PSF, the DSO and the read subsystem data command to retrieve the read diagnostic parameters of the first path and the second path.

23. The computer program product of claim 17, wherein the set of PSF, SSO, Device Server Option (DSO) and the read subsystem data command is configured in an operating system in the second type of request to secure read diagnostic parameters for the second storage area network that is not visible to the host in the FC protocol, wherein the FC protocol is used by the first storage area network and the second storage area network.

* * * * *